(12) United States Patent
von Kaenel

(10) Patent No.: US 8,634,256 B2
(45) Date of Patent: Jan. 21, 2014

(54) MULTI-MODE INTERFACE CIRCUIT

(75) Inventor: Vincent R. von Kaenel, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 266 days.

(21) Appl. No.: 13/182,952

(22) Filed: Jul. 14, 2011

(65) Prior Publication Data

US 2012/0250427 A1    Oct. 4, 2012

Related U.S. Application Data

(60) Provisional application No. 61/470,375, filed on Mar. 31, 2011.

(51) Int. Cl.
*G11C 7/00* (2006.01)

(52) U.S. Cl.
USPC .................................... 365/189.11

(58) Field of Classification Search
USPC .................................... 365/189.11
See application file for complete search history.

(56) References Cited

U.S. PATENT DOCUMENTS

| | | | |
|---|---|---|---|
| 7,750,687 B2 | 7/2010 | Muhlbacher | |
| 8,154,323 B2 * | 4/2012 | Kim et al. | 327/108 |
| 8,320,189 B2 * | 11/2012 | Nirschl | 365/185.23 |
| 8,446,173 B1 * | 5/2013 | Faucher et al. | 326/86 |
| 2010/0156498 A1 | 6/2010 | Bagepalli | |
| 2010/0219800 A1 * | 9/2010 | Fukuoka et al. | 323/282 |
| 2010/0264975 A1 * | 10/2010 | Scott | 327/333 |
| 2011/0004774 A1 | 1/2011 | Hansquine | |
| 2011/0050746 A1 * | 3/2011 | Tsuchi | 345/690 |
| 2011/0254591 A1 * | 10/2011 | Monga | 326/80 |

* cited by examiner

*Primary Examiner* — Huan Hoang
*Assistant Examiner* — Pablo Huerta
(74) *Attorney, Agent, or Firm* — Meyertons, Hood, Kivlin, Kowert & Goetzel, P.C.; Lawrence J. Merkel; Erik A. Heter

(57) ABSTRACT

An interface circuit having a first signal path and a second signal path is disclosed. The first and second signal paths are coupled between a first and second nodes, wherein the first node is coupled to receive signals from a source external to an integrated circuit upon which the interface circuit is implemented. Each of the first and second signal paths include circuitry implemented with transistors rated at higher voltages than internal circuitry coupled to receive signals therefrom. The first and second signal paths may utilize different circuit topologies. The interface may thus be used in environments where external circuitry coupled to the external input node conforms to one of a number of different standards (e.g., LPDDR1 and LPDDR2).

24 Claims, 4 Drawing Sheets

MULTI-MODE INTERFACE CIRCUIT

PRIORITY CLAIM

The present application claims priority to U.S. Provisional Patent Application 61/470,375 filed on Mar. 31, 2011.

BACKGROUND

1. Field of the Invention

This invention relates to electronic circuits, and more particularly, to interface circuits operating at multiple voltages.

2. Description of the Related Art

Electronic circuits of different types have a wide variety of voltage requirements. For example, a particular type of system-on-a-chip (SOC) may operate at a particular voltage, while memory circuits and I/O devices to which it is coupled to in a system operate at different voltages. Despite these different voltages, communications between devices operating at different voltages is often required for a system to implement intended functionality. However, some circuits may be damaged if exposed to higher voltages that are used to operate other circuits.

Furthermore, on many integrated circuits (IC's) such as an SOC mentioned above, multiple voltage domains on the IC are present, despite the fact that communications between devices in the different domains is necessary. To enable communications between circuits in different voltage domains, various types of interface circuitry may be utilized. Level shifters are one type of circuit that may enable communications between two circuits residing in different voltage domains. A level shifter circuit may receive power from voltage sources in each of the power domains between which communications are to be enabled. Signals may be input into a level shifter at a first voltage (or first voltage swing) that corresponds to the operating voltage of a first voltage domain. Signals may be output from the level shifter at a second voltage (or second voltage swing) that corresponds to the operating voltage of the second voltage domain. In some cases, the input signals may have a greater voltage swing than the output signals. In other cases, the input signals may have a smaller voltage swing than the output signals.

Level shifters may be used in conjunction with driver and receiver circuits that are capable of operation within their respective voltage domains. For example, when a logic value is to be conveyed from a first voltage domain to a second, a signal conveying the logic value may be provided to a receiver in the first voltage domain and then to a level shifter. The level shifter may receive the signal in the first voltage domain and perform a level shifting operation such that the logic value it provided on a signal into the second voltage domain. A driver in the second voltage domain may receive the signal and thus drive the logic value to other circuits.

SUMMARY

An interface circuit is disclosed. In one embodiment, the interface circuit includes a first input path coupled between an external node and an internal node, and a second input path coupled between the external node and the internal node. The first input path includes a first receiver having an input coupled to the external node. The first input path further includes a first level shifter having an input coupled to an output of the first receiver, and an output coupled to a first buffer. An output of the first buffer is coupled to the internal node. Transistors implementing the first receiver are rated for operation up to a first voltage level. The level shifter is implemented with transistors rated for operation up to the first voltage level and further includes transistors rated for operation up to a second voltage level less than the first. The first buffer includes transistors rated for operation up to the second voltage level. The second input path includes a passgate and a second receiver circuit. The second receiver circuit includes a first input coupled to the passgate, and a second input coupled to receive a reference voltage. The second receiver is configured to provide an output signal based on a comparison between the signal received from the passgate and the reference voltage. The output of the second receiver is provided to a level shifter, which in turn provides a signal to a buffer. The output of the buffer is coupled to the internal node. The passgate is implemented using transistors rated for operation up to the first voltage level, while the other components of the second input path are implemented using transistors rated up to the second voltage level. The second voltage level may be less than the first voltage level.

In general, an interface circuit is contemplated for providing an external interface for an integrated circuit (IC), where the external interface may be implemented according to one of a number of different standards. The operating voltages of the internal circuitry of the IC may be different from that of the external circuitry to which the IC is coupled to through the interface. The operating voltage of the external circuitry may depend upon the standard for which it is implemented to comply. Different input paths may be provided for at least two different standards. In a first input path implemented for a first standard, transistors rated for operation at a first voltage may be used. In a second input path implemented for a second standard may also include transistors rated for operation at the second voltage, although the second input path may have a circuit topology different from the first. The input paths may both be coupled to an internal node, and each may include a level shifter for shifting the voltage of the received signals to a voltage at which the internal circuitry operates. The internal circuitry may include transistors rated to operate at a second voltage that may be different from first voltage. At least one output path may also be provided, which receives signals having a voltage level according to the second voltage and provides an output signal to the external circuitry at either the first or second voltage, depending on the standard used.

In one embodiment, an interface circuit may be used for providing an interface between an IC and a low power double data rate (LPDDR) memory. Such memories may be implemented using the LPDDR1 standard, which operates on a 1.8 volt level, or the LPDDR2 standard, which operates on a 1.2 volt level. Thus, a first input path may be implemented for receiving signals according to the LPDDR1 standard, while a second signal path may be implemented for receiving signals according to the LPDDR2 standard. The first input path may include a receiver implemented with transistors rated at a first voltage that may safely operate at the voltage of the LPDDR1 standard (1.8 volts). The second input path may include a passgate and associated circuitry. An input node may be coupled to receive signals from an external source, and both the first and second input paths include circuitry coupled to receive signals from this node. The circuitry coupled to receive signals from the input node may use high voltage transistors that may safely operate at the voltages of either of the standards. The circuit topology of the second input path may however be different from that of the first. More particularly, the evaluation circuitry in the first input path may include the high voltage transistors. The evaluation circuitry in the second path may be implemented using low voltage transistors, although isolation circuitry (e.g., a passgate) may be implemented using the high voltage transistors.

It is noted that the rated voltage of the transistors may be different from the voltages of the LPDDR1 and LPDDR2 standards. For example, the transistors of the receiver in the first input path and the isolation circuitry in the second path may be rated for a 2.5 volt level, which may thus be safe for 1.8 volt level of LPDDR1 standard and the 1.2 volt level of the LPDDR2 standard. Both input paths may include level shifters and other circuitry implemented using transistors rated at a second voltage, e.g., 1.2 volts. This second voltage may also be used as an operating voltage for circuitry internal to the IC.

BRIEF DESCRIPTION OF THE DRAWINGS

The following detailed description makes reference to the accompanying drawings, which are now briefly described.

Figure 1:
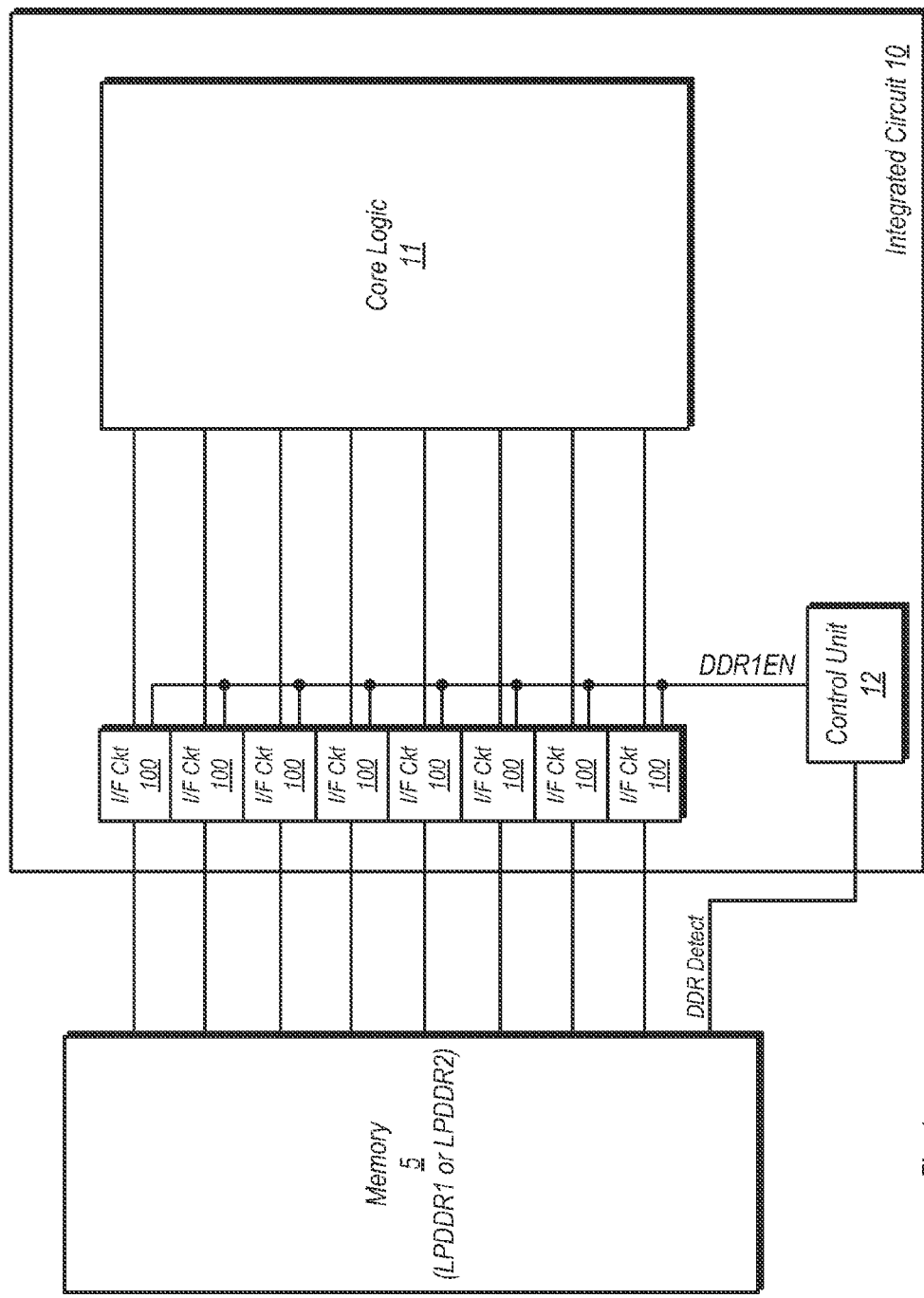
FIG. 1 is a block diagram of one embodiment of a computer system illustrating a processor coupled to a memory.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Integrated Circuit:

FIG. 1 is a block diagram of one embodiment of an integrated circuit (IC) coupled to a memory. In the embodiment shown, IC 10 includes core logic 11, a control unit 12, and a number of interface circuits 100. Core logic 11 in this embodiment may receive signals conveyed from memory 5 via corresponding ones of interface circuit 100. Core logic 100 may also send signals to memory 5 through embodiments of interface circuit 100 that are enabled for transmitting signals thereto.

In the embodiment shown, memory 5 may be one of an LPDDR1 memory or an LPDDR2 type memory, although other memory types are possible and contemplated. Signals conveyed from memory 5 when implemented as an LPDDR1 memory may have a voltage swing of 1.8 volts. If memory 5 is an LPDDR2 memory, signals having a voltage swing conveyed therefrom may have a voltage swing of 1.2 volts. Given the different voltage swings of these two type memories, each interface circuit 100 may have separate signal paths for conveying LPDDR1 signals and LPDDR2 signals. This may enable IC 10 to function with either one of these memory types even though it may not be known in advance which type it may be used with.

Control unit 12 in the embodiment shown is coupled to receive an indicator signal ('DDR Detect') from memory 5, indicating whether it is an LPDDR1 or LPDDR2 memory. In one embodiment, the indicator signal may be a logic high signal conveyed at a level commensurate with the voltage swing of the signals output by memory 5. For example, if memory 5 is an LPDDR1 memory, it may convey a logic high at approximately 1.8 volts to control unit 12. If memory 5 is an LPDDR2 memory, it may convey a logic high at approximately 1.2 volts. Control unit 12 may include circuitry operable to detect the voltage level of the received signal in order to determine whether the memory is an LPDDR1 or LPDDR2 memory. If control unit 12 determines that memory 5 is an LPDDR1 memory, it may assert a control signal ('DDR1EN') to enable, in each interface circuit 100, a signal path operable to receive signals from an LPDDR1 memory. If control unit 12 determines that memory 5 is an LPDDR2 memory, it may de-assert the control signal, thereby enabling, in each interface circuit 100, a signal path operable to receive signals from an LPDDR2 memory. In addition, each interface circuit 100 may include counterpart signal paths for transmitting signals to LPDDR1 and LPDDR2 memories.

It is noted that while the example shown herein is directed to interfacing with a memory that conforms to either the LPDDR1 standard or the LPDDR2 standard, other embodiments of interface circuit 100 are possible and contemplated. In general, embodiments of interface circuits configured to interfacing to multiple memory types are possible and contemplated. Thus, while the embodiment of an interface circuit 100 to be discussed in FIG. 2 is also directed to interfacing with an LPDDR1 memory or an LPDDR2 memory, embodiments of similar circuitry may be adapted for different memory types are possible and contemplated.

Figure 2:
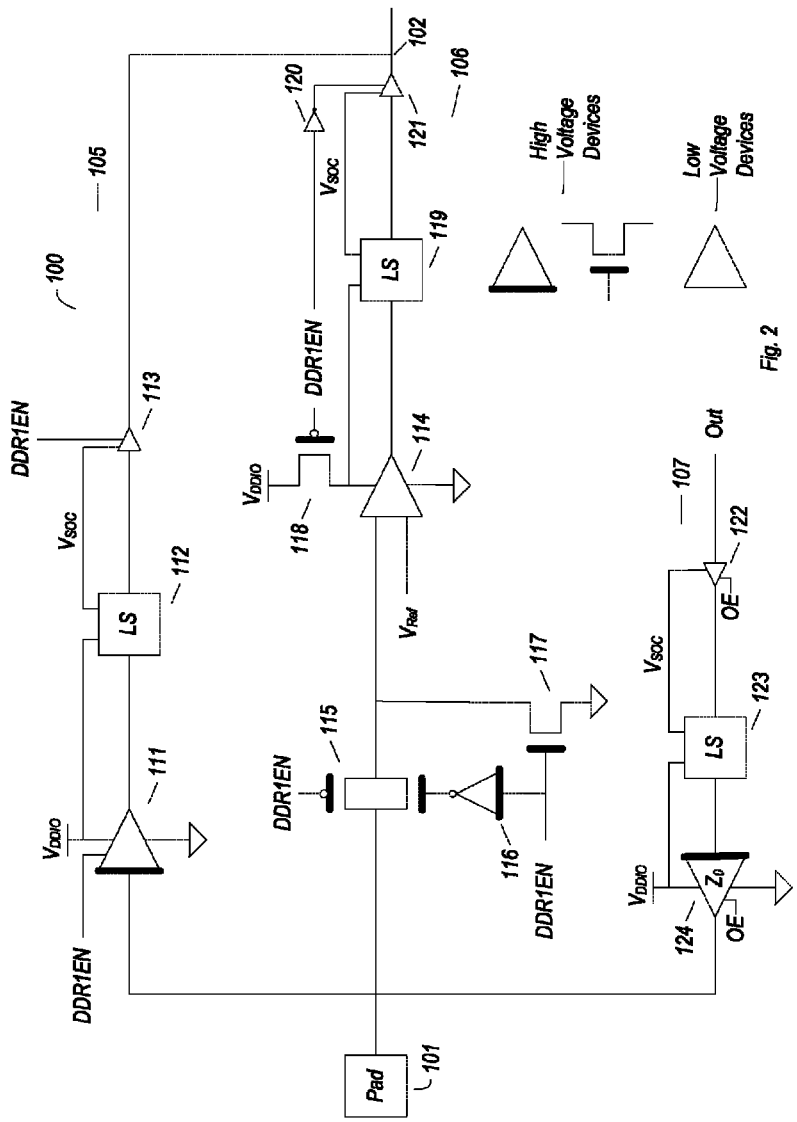
FIG. 2 is a diagram illustrating one embodiment of an interface circuit.

Interface Circuit:

Turning now to FIG. 2, a diagram illustrating one embodiment of an interface circuit is shown. The embodiment illustrated herein will be discussed in terms of two low power double data rate (LPDDR) standards, LPDDR1 and LPDDR2. However it is to be understood that this embodiment is exemplary, and is not intended to limit the scope of this disclosure. Accordingly, a wide variety of circuit embodiments may be used in a number of different applications while still falling within the scope of this disclosure, including others that are not implemented according to the LPRDD1 and LPRDD2 standards.

The circuit shown in FIG. 2 may be instantiated a number of times on an integrated circuit (IC). The IC may be a processor, a system-on-a-chip (SOC) or other type of IC. The circuit embodiment illustrated herein may be used in a system that uses memory that conforms to one of the LPDDR1 and LPDDR2 standards.

In the embodiment shown, interface circuit 100 includes an input node 101 and an output node 102. The input node may be a pad or other structure that is coupled to receive signals from (or provide signals to) circuitry external to the IC upon which interface circuit 100 may be implemented. The output node may be a node coupled to circuitry internal to the IC. Two different signal input paths are provided in the illustrated embodiment, input path 105 and input path 106. Input path 105 may be used to convey signals from input node 101 to output node 102 according to the LPDDR1 standard. Input path 106 may be used to convey signals from input node 101 to output node 102 according to the LPDDR2 standard. As will be explained below, only one of these paths may be enabled at a given point in time, in accordance with the standard to which the memory in the system conforms.

The first input path 105 in the embodiment shown includes receiver 111, level shifter 112, and buffer 113. Receiver 111 in this example includes an input coupled to input node 101. As indicated by the legend in the lower right hand portion of the drawing, receiver 111 may be implemented using one or more high voltage transistors. The term 'high voltage' as used herein may be defined as a rated voltage for a transistor that is greater than that of the internal circuits in the voltage domain of the IC coupled to receive signals via output node 102. Furthermore, the term 'high voltage' as used herein may indicate an operating voltage that exceeds a safe operating voltage for the internal circuits coupled to receive signals via output node 102. The term 'low voltage' as used herein may be defined as a rated voltage for a transistor that allows for safe operation of the internal circuits. Exemplary values for the high and low voltages are 2.5 volts and 1.2 volts, although other suitable values may be chosen in other embodiments in accordance with their operating voltage requirements.

In terms of physical characteristics, the high voltage transistors may have a thicker gate oxide than their low voltage counterparts. Other physical characteristics may also differ between the high and low voltage transistors discussed herein. The thicker gate oxide may prevent damage to that transistor when higher gate-to-source, or gate-to-drain, and/or gate-to-bulk voltages occur.

In this implementation, since input path 105 is suitable for receiving signals transmitted according to the LPDDR1 standard, the transistors of receiver 111 may be rated for a voltage of at least 1.8 volts. In some embodiments, the voltage rating of the transistors may be even greater. For example, one embodiment is contemplated wherein the voltage swing of the transistors used to implement receiver 111 is 2.5 volts. Since 2.5 volts is greater than the specified voltage swing for the LPDDR1 standard, transistors rated for such a swing may safely operate according to this standard. Thus, if VDDIO (i.e. the supply voltage provided to receiver 111) is 1.8 volts (as used with the LPDDR1 standard), transistors rated for 2.5 volt operation may safely operate while being able to implement the functionality of receiver 111.

It is noted that the term 'voltage swing' as used herein may define a peak voltage at which the transistor may operate (although occasional overshoot may occur at times). For example, a transistor having a voltage swing of 2 volts may operate in a range between 0 volts and 2 volts. A logic 1 for digital circuits implemented according to a 2 volt swing may ideally be 2 volts, while a logic 0 implemented according to the same swing may ideally be 0 volts. The actual logic 1 and logic 0 voltage may however depend on the respective threshold voltages of such transistors.

The output of receiver 111 in the embodiment shown is coupled to a level shifter 112, which may be implemented using low voltage devices (e.g., 1.2 volts), but may also include some high voltage devices. Level shifter 112 is coupled to receive power from both VDDIO and VSOC, the latter of which is an internal operating voltage for the system on a chip. VSOC may be less than or equal to the voltage at which the low voltage transistors are rated. For example, in the embodiment where the low voltage transistors are 1.2 volts, VSOC may be 0.8 volts. Thus, the signal input into level shifter 112 may have a voltage swing based on VDDIO (1.8 volts for LPDDR1), while the signal output therefrom may have a voltage swing according to the exemplary VSOC value of 0.8 volts. Level shifter 112 may be implemented using any suitable level-shifting circuit topology.

The signal output from level shifter 112 may be received by buffer 113. In the embodiment shown, buffer 113 may be implemented using low voltage transistors (e.g., the 1.2 volt transistors discussed above) suitable for operation in the VSOC power domain. Buffer 113 may drive a signal to the output node 102 at the same logic level of the signal that it receives.

Both receiver 111 and buffer 113 in the embodiment shown are coupled to receive an enable signal, DDR1EN. In this particular example, both receiver 111 and buffer 113 may be enabled when DDR1EN is at a high logic level. When DDR1EN is at a low logic level, the outputs of receiver 111 and buffer 113 may be tri-stated, i.e. in a high impedance state and thus not driven. Accordingly, when DDR1EN is low, input path 105 may be inhibited from conveying logic values from input node 101 to output node 102.

Input path 106 in the embodiment shown is arranged for conveying signals received according to the LPDDR2 standard, and is thus implemented using a circuit topology different from input path 105. When interface circuit 100 is implemented in an embodiment that utilizes the LPDDR2 standard, the value of supply voltage VDDIO may be 1.2 volts. The different topology of input path 106 may be implemented in order to allow compliance with the high voltage used for LPDDR1 while still allowing the implementation of an LPDDR2 path. Accordingly, implementation of a circuit that is suitable for us in both LPRDD1 and LPRDD2 embodiments while utilizing certain types of transistors is made possible by providing different circuit topologies for the different standards.

In this embodiment, input path 106 includes a passgate 115 coupled allow passage of a signal received from input node 101. Passgate 115 in this embodiment is implemented using high voltage devices. Passgate 115 may be active when DDR1EN is low. More particularly, when DDR1EN is low, a corresponding low is applied to the gate of the PMOS (p-channel metal oxide semiconductor) transistor of passgate 115, while a high generated by inverter 116 is applied to the NMOS (n-channel metal oxide semiconductor) transistor of the passgate. It is noted that inverter 116 in the embodiment shown is also implemented using high voltage devices.

When passgate 115 is active, a signal received on input node 101 may be allowed to propagate to one input of receiver 114. The other input of receiver 114 in the embodiment shown is a reference voltage, Vref. Receiver 114 may compare the voltage level of the signal received on its first input to the reference voltage in order to determine whether to output a logic 1 or a logic 0. In this example, if the voltage of the signal received on the first input is greater than the reference voltage, receiver 114 may output a logic 1. If the voltage of the signal received on the first input is less than the reference voltage, receiver 114 may output a logic 0. As receiver 114 is in the signal path utilized for receiving LPDDR2 signals, it may be implemented using the low voltage transistors rated at 1.2 volts in this embodiment.

The output of receiver 114 may be provided to level shifter 119, which is coupled to receive both VDDIO (e.g., 1.2 volts for LPDDR2) and VSOC (e.g., the 0.8 volt value discussed above). The signal input to level shifter 119 may have a voltage swing up to a value of VDDIO, while a signal output therefrom may have a voltage swing up to a value of VSOC. Level shifter 119 may be implemented using the low voltage transistors in this particular embodiment (1.2 volts) since these devices would be safe for operation with the 1.2 volt VDDIO implemented with the LPDDR2 standard. The low voltage transistors may also be safe for operation at the voltage of VSOC.

The output of level shifter 119 may be provided to buffer 121, which may be similar or identical to buffer 113. Accordingly, buffer 121 may be implemented using the low voltage transistors, and may be arranged to drive a signal to output node 102 with a voltage swing in accordance with VSOC.

Similar to input path 105, input path 106 may be enabled or disabled responsive to a state of the DDR1EN signal. Whereas input path 105 in the embodiment shown is arranged to be enabled when DDR1EN is high, input path 106 is arranged to be enabled when DDR1EN is low. As previously noted, passgate 115 may be activated responsive to a low on DDR1EN. The low on DDR1EN may also be received on the gate of PMOS transistor 118, which may be activated responsive thereto. When active, transistor 118 couples VDDIO to receiver 114. A low on DDR1EN may also be inverted into a high by inverter 120, which in turn it provided to buffer 121 in order to enable that device.

When DDR1EN is high, receiver 114 does not receive power from VDDIO, and is thus inactive. The high on DDR1EN is also inverted to a low on the output of inverter 120, thereby causing buffer 121 to be held inactive. As previously noted, a high on DDR1EN also results in the deactivation of passgate 115. Transistor 117 (a high voltage transistor in the embodiment shown) may be activated when DDR1EN is high and deactivated when DDR1EN is low. When active, transistor 117 provides a pull-down path between the first input of receiver 114 and ground. This may provide a drain path for leakage currents that might pass through passgate 115 even when it is otherwise disabled. This in turn can prevent the first input node of receiver 114 from charging when input path 106 is inactive.

Together, the passgate 115, the inverter 116, the transistor 117 and the transistor 118 provide an isolation circuit for the receiver 114 and other circuitry implemented with low voltage transistors. If a higher voltage is being used, e.g., for LPDDR1, the isolation circuit may isolate the low voltage transistors from the possibly damaging effects of the higher voltages.

In the embodiment shown, interface circuit 100 also includes an output path 107. Output path 107 includes a buffer 122, a level shifter 123, and a driver 124. Buffer 122 may be implemented using low voltage devices, while level shifter 123 may include both low voltage and high voltage devices. Driver 124 may be implemented using high voltage devices. Signals received into signal path 107 may initially be received by buffer 122 and driven to level shifter 123. Level shifter 123 may receive signals having a voltage swing in accordance with VSOC, and may output signals having a voltage swing in accordance with VDDIO. The signal output from level shifter 123 may be received by driver 124 and driven onto node 101. Both buffer 122 and driver 124 in the embodiment shown are coupled to receive output an enable ('OE') signal. When the output enable signal is asserted high in this embodiment, the output path may be enabled. When the output enable signal is low, the respective outputs of both buffer 122 and driver 124 may be tri-stated, and thus output path 107 may be inactive.

The circuit topology of output path 107 in this embodiment may be considered a mirror image of input path 105. An output path that is a mirror image of input path 106 is also possible and contemplated. Accordingly, interface circuit 100 may be enabled to send and receive signals to and from an LPDDR1 memory and an LPDDR2 memory, despite their different voltage requirements.

Figure 3:
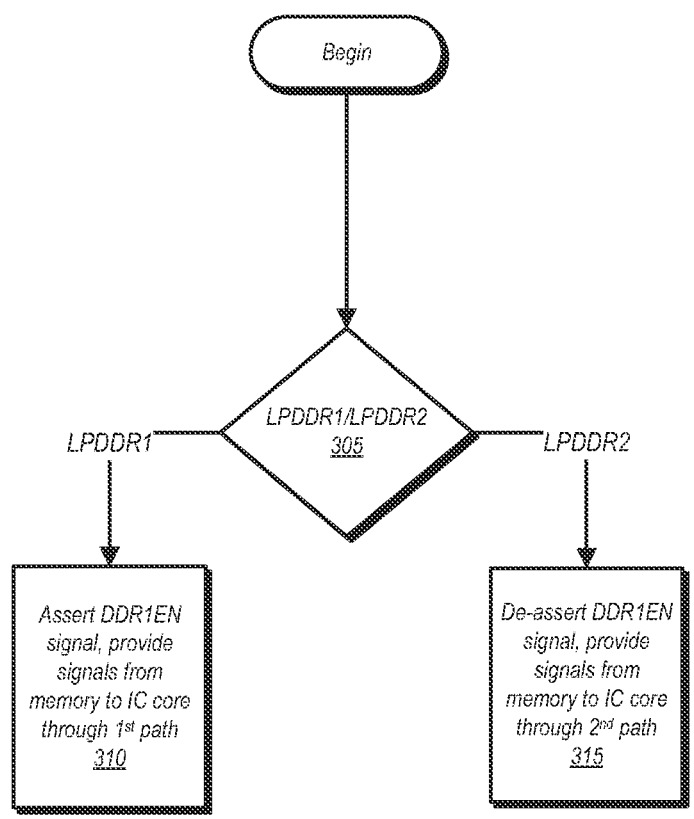
FIG. 3 is a flow diagram of one embodiment of a method for operating an interface circuit.

Method Flow Diagram:

FIG. 3 is a method flow diagram illustrating the operation of one embodiment of interface circuit 100 as discussed above. In the embodiment shown, method 300 may include determining if a particular memory coupled to multiple instances of an interface circuit 100 is an LPDDR1 memory or an LPDDR2 memory (block 305). If the memory is an LPDDR1 memory (block 305, LPDDR1), the DDR1EN signal may be asserted, and signals received from the memory may be conveyed through a first path of each of a number of interface circuits 100 (block 310). If the memory is an LPDDR2 memory (block 305, LPDDR2), the DDR1EN signal may be de-asserted, and signals received from the memory may be conveyed through a second path of each of a number of interface circuits 100 (block 315).

Figure 4:
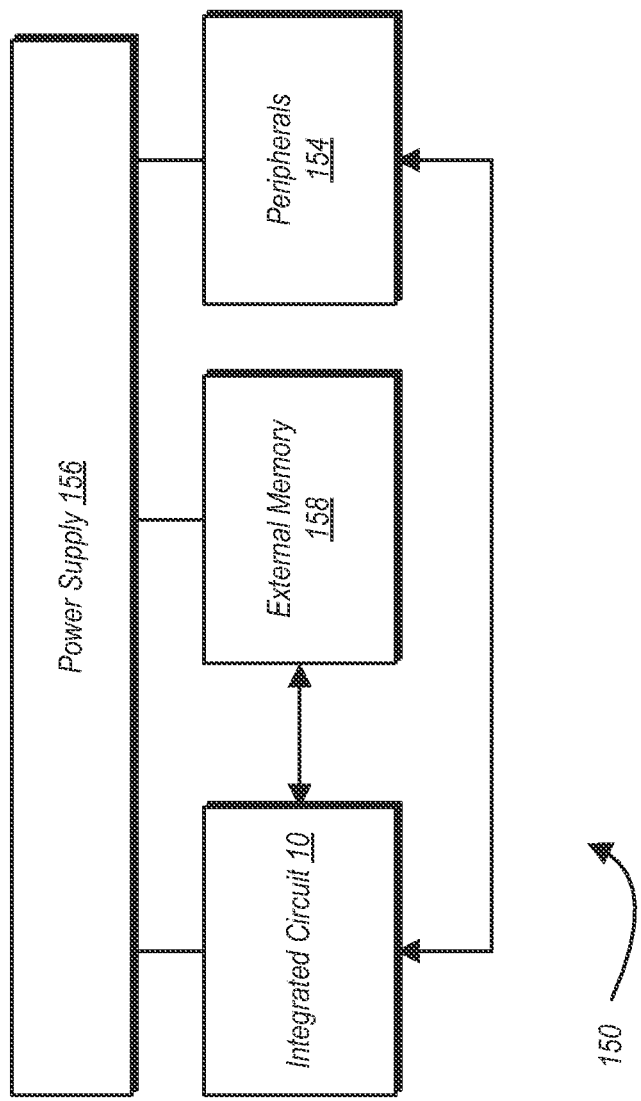
FIG. 4 is a block diagram of one embodiment of a system.

Exemplary System:

Turning next to FIG. 4, a block diagram of one embodiment of a system 150 is shown. In the illustrated embodiment, the system 150 includes at least one instance of an IC 10 (e.g., from FIG. 1) coupled to one or more peripherals 154 and an external memory 158. A power supply 156 is also provided which supplies the supply voltages to the IC 10 as well as one or more supply voltages to the memory 158 and/or the peripherals 154. In some embodiments, more than one instance of the IC 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc. Memory 158 may in some embodiments be the equivalent of memory 5 shown in FIG. 1, and thus may be coupled to IC 10 via a number of interface circuits 100.

Numerous variations and modifications will become apparent to those skilled in the art once the above disclosure is fully appreciated. It is intended that the following claims be interpreted to embrace all such variations and modifications.

What is claimed is:

1. An interface circuit comprising:
   a first signal path coupled between a first node and a second node, wherein the first signal path includes a first circuit including one or more transistors rated for a first voltage and a second circuit including one or more transistors rated for a second voltage;
   a second signal path coupled between the first node and the second node, wherein the second signal path includes a third circuit including one or more transistors rated for the first voltage and a fourth circuit including one or more transistors rated for the second voltage; and
   a third signal path including a level shifter and a driver having an input coupled to an output of the level shifter and an output coupled to the first node.

2. The interface circuit as recited in claim 1, wherein the first voltage is greater than the second voltage.

3. The interface as recited in claim 1, wherein the first, second, third, and fourth circuits are each coupled to receive an enable signal having a first logic state and a second logic state, wherein the third and fourth circuits are inhibited responsive to the enable signal being in the first logic state and wherein the first and second circuits are inhibited responsive to the enable signal being in a second logic state.

4. The interface as recited in claim 1, wherein the first circuit is a receiver having an input coupled to the first node and wherein the second circuit is a buffer having an output coupled to the second node, and wherein the first signal path further includes a level shifter coupled between an output of the receiver and an input to the level shifter, and wherein the third circuit is a passgate having an input coupled to the first node and wherein the fourth circuit is a buffer having an output coupled to the second node, and wherein the second signal path further includes a level shifter coupled between an output of the passgate and an input of the buffer.

5. An integrated circuit comprising:
   one or more interface circuits, wherein each of the one or more interface circuits is configured to be coupled to a memory, wherein the memory is configured to provide corresponding signals to each of the one or more interface circuits at one of a first voltage swing or a second voltage swing, and wherein each of the one or more interface circuits includes:
      a first signal path coupled between an external node and an internal node, wherein the first signal path includes an first circuit implemented with transistors rated at a first voltage, a first level shifter and a second circuit implemented with transistors rated at a second voltage that is less than the first voltage, wherein the first circuit is coupled to the external node and the second circuit is coupled to the internal node;
      a second signal path coupled between the external node and the internal node, wherein the second signal path includes a third circuit implemented with transistors rated at the first voltage and fourth and fifth circuits each implemented with transistors rated at the second voltage, wherein the fourth circuit is coupled to the third circuit and the fifth circuit is coupled to the external node, wherein the third circuit is coupled to the external node and the fifth circuit is coupled to the internal node.

6. The integrated circuit as recited in claim 5, further comprising a control unit, wherein the control unit is configured to enable the first signal path and disable the second signal path if the memory is configured to provide signals to the one or more interface circuits at the first voltage swing, and further configured to enable the second signal path and disable the first signal path if the memory is configured to provide signals to the one or more interface circuits according at the second voltage swing, wherein a magnitude of the first voltage swing is greater than a magnitude of the second voltage swing.

7. The integrated circuit as recited in claim 5, wherein the first signal path includes a first level shifter coupled between the first circuit and the second circuit and wherein the second signal path includes a second level shifter coupled between the fourth circuit and the fifth circuit.

8. The integrated circuit as recited in claim 7, wherein:
   the first circuit is a first receiver circuit having a corresponding input coupled to the external node, wherein the second circuit is a first buffer having a corresponding output coupled to the internal node, wherein the first level shifter is configured to receive signals from the first receiver at a first voltage to provide corresponding signals to the first buffer at a second voltage, wherein the second voltage is less than the first voltage; and
   the third circuit is a passgate, wherein the fourth circuit is a receiver circuit having a first input coupled to the passgate and a second input coupled to receive a reference voltage, and wherein the fifth circuit is a second buffer having a corresponding output coupled to the external node, wherein the second level shifter is configured to receive signals from the second receiver at the first voltage and further configured to provide corresponding signals to the second buffer at the second voltage.

9. The integrated circuit as recited in claim 5, further comprising a third signal path having a driver circuit configured to, when enabled, drive signals onto the external node, wherein the driver circuit is implemented with transistors rated at the first voltage.

10. A method comprising
    enabling a first signal path coupled between an external pad of an interface circuit to an internal node of the input circuit, wherein the first signal path includes an first circuit implemented with transistors rated at a first voltage, a first level shifter and a second circuit implemented with transistors rated at a second voltage that is less than the first voltage, wherein the first circuit is coupled to the external and the second circuit is coupled to the internal node, wherein said enabling the first signal path comprises asserting an first signal;
    enabling a second signal path coupled between an external pad of an interface circuit to an internal node of the input circuit wherein the second signal path includes a third circuit implemented with transistors rated at the first voltage and fourth and fifth circuits each implemented with transistors rated at the second voltage, wherein the fourth circuit is coupled to the third circuit and the fifth circuit is coupled to the external node, wherein the third circuit is coupled to the external node and the fifth circuit is coupled to the internal node, wherein said enabling the second signal path comprises de-asserting the first signal.

11. The method as recited in claim 10, further comprising asserting the first signal responsive to the interface circuit being coupled to a first memory configured to output signals at a first voltage swing.

12. The method as recited in claim 11, further comprising de-asserting the first signal being coupled to a second memory configured to output signals at a second voltage swing having a magnitude that is less than the first voltage swing.

13. The method as recited in claim 12, further comprising:
a control unit asserting the first signal responsive to determining the memory is configured to output signals at the first voltage swing; and
the control unit de-asserting the first signal responsive to determining the memory is configured to output signals at the second voltage swing.

14. The method as recited in claim 10, further comprising:
a first level shifter level-shifting a signal conveyed in the first signal path; and
a second level-shifter level shifting a signal conveyed in the second signal path.

15. A system comprising:
a memory; and
an integrated circuit (IC) having a plurality of interface circuits, wherein each of the interface circuits is electrically coupled to a corresponding one of a plurality of input/output (I/O) pins of the memory;
wherein each of the plurality of interface circuits includes:
a first signal path coupled between an external node and an internal node, the first signal path including a first input circuit having one or more transistors rated for a first voltage and a first output circuit having one or more transistors rated for a second voltage that is less than the first voltage;
a second signal path coupled between the external node and the internal node, the first signal path including a second input circuit having one or more transistors rated for the first voltage and a second output circuit having one or more transistors rated for the second voltage;
wherein the IC further includes a control unit configured to enable the first signal path and disable the second signal path if the memory is configured to convey signals having a first voltage swing and further configured to enable the second signal path and disable the first signal path if the memory is configured to convey signal having a second voltage swing different from the first voltage swing.

16. The system as recited in claim 15, wherein the first input circuit is a first receiver and the first output circuit is a first buffer, and wherein the first signal path further includes a first level shifter coupled between the receiver and the buffer.

17. The system as recited in claim 16, wherein the second input circuit is a passgate and wherein the second output circuit is a second buffer, and wherein the second signal path further includes:
a second receiver coupled to the passgate and further coupled to receive a reference voltage; and
a second level shifter coupled between the second receiver and the second buffer.

18. The system as recited in claim 17, wherein the second receiver is configured to drive its respective output high if a signal conveyed from the passgate has a voltage greater than the reference voltage and further configured to drive its respective output low if the signal conveyed from the passgate has a voltage less than the reference voltage.

19. The system as recited in claim 15, wherein the first path is configured to be enabled responsive to a control signal being driven to a first logic state by the control unit, and wherein the second path is configured to be enable responsive to the control signal being driven to a second logic state by the control unit, wherein the second logic state is a logical complement of the first logic state.

20. A circuit comprising:
a first input path coupled between a first node and a second node, wherein the first input path includes:
a first receiver circuit, the receiver circuit including a first plurality of transistors rated for operation up to a first voltage, wherein the receiver circuit includes an input coupled to the first node;
a first level shifter coupled to an output of the receiver circuit; and
a first buffer coupled to a signal output from the first level shifter and further coupled to provide a first signal to the second node, the first buffer including a second plurality of transistors rated for operation up to a second voltage that is less than the first voltage;
a second input path coupled between the first node and the second node, wherein the second input path includes:
a passgate including a third plurality of transistors rated for operation up to the first voltage;
a second receiver having a first input coupled to the passgate and a second input coupled to receive a reference voltage;
a second level shifter coupled to receive an output from the second receiver; and
a second buffer coupled to a signal output from the second level shifter and further coupled to provide a second signal to the second node, the second buffer including a fourth plurality of transistors rated for operation up to the second voltage.

21. The circuit as recited in claim 20, wherein:
the first input path is enabled responsive to an enable signal being in a first logic state, and wherein the first input path is disabled responsive to the enable signal being in a second logic state;
wherein the second input path is enabled responsive to the enable signal being in the second logic state and disabled responsive to the enable signal being in the first logic state.

22. The circuit as recited in claim 21, further comprising a control unit configured to enable the first input path if the circuit is coupled to a memory configured to send and receive signals according to a first voltage swing and further configured to enable the second input path if the circuit is coupled to a memory configured to send and receive signals according to a second voltage swing, wherein a magnitude of the second voltage swing is less than a magnitude of the first voltage swing.

23. The circuit as recited in claim 20, wherein the first and second level shifters and the second receiver each include one or more transistors rated for operation up to the second voltage.

24. The circuit as recited in claim 23, further comprising an output driver configured to drive an output signal onto the first node, wherein the output driver includes one or more transistors rated for operation up to the first voltage.

* * * * *